United States Patent
Hjelm

(10) Patent No.: US 11,451,990 B2
(45) Date of Patent: Sep. 20, 2022

(54) METHOD AND MANAGING MODULE FOR ENABLING MANAGEMENT OF OPERATION OF NETWORK NODE

(71) Applicant: Telefonaktiebolaget LM Ericsson (publ), Stockholm (SE)

(72) Inventor: Johan Hjelm, Sendai (JP)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 39 days.

(21) Appl. No.: 16/764,777

(22) PCT Filed: Nov. 17, 2017

(86) PCT No.: PCT/SE2017/051141
§ 371 (c)(1),
(2) Date: May 15, 2020

(87) PCT Pub. No.: WO2019/098894
PCT Pub. Date: May 23, 2019

(65) Prior Publication Data
US 2020/0367084 A1    Nov. 19, 2020

(51) Int. Cl.
*H04B 7/185* (2006.01)
*H04L 41/0893* (2022.01)
(Continued)

(52) U.S. Cl.
CPC ........ *H04W 24/10* (2013.01); *H04B 7/18506* (2013.01); *H04L 41/0893* (2013.01);
(Continued)

(58) Field of Classification Search
CPC ...... G05D 1/0005–0022; G05D 1/0276–0285; H04B 7/02–026;
(Continued)

(56) References Cited

U.S. PATENT DOCUMENTS

2004/0004948 A1\* 1/2004 Fletcher ............... H04W 88/08
2008/0280638 A1   11/2008 Malladi et al.
(Continued)

FOREIGN PATENT DOCUMENTS

GB   2483752 A   3/2012
WO   2017/050586 A1   3/2017

OTHER PUBLICATIONS

International Search Report and Written Opinion issued in International Application No. PCT/SE2017/051141 dated Sep. 20, 2018 (10 pages).

*Primary Examiner* — Timothy J Weidner
(74) *Attorney, Agent, or Firm* — Rothwell, Figg, Ernst & Manbeck, P.C.

(57) ABSTRACT

A method and a managing module (110) for enabling management of operation of a network node (131) in a network (100) are disclosed. A set of indications of intervals for reporting of data is configured into the wireless devices (141-148). The managing module (110) obtains (210) the set of indications of intervals for reporting of data. The managing module (110) organises (220) the wireless devices (141-148) into a set of one or more groups (151-153) of wireless devices (141-148) based on the set of indications of intervals for reporting of data. Moreover, the managing module (110) determines (230) information for aligning for aligning reporting from the wireless devices (141-148) within each group of the set of one or more groups (151-153). The managing module (110) provides (240) the information for aligning reporting. A corresponding computer program (605) and a computer program carrier (605) are also disclosed.

11 Claims, 6 Drawing Sheets

(51) Int. Cl.
 H04W 24/02 (2009.01)
 H04W 24/10 (2009.01)
 H04W 40/18 (2009.01)
 H04W 40/20 (2009.01)
 H04W 52/02 (2009.01)
 H04W 52/28 (2009.01)
 H04W 56/00 (2009.01)
 H04W 72/12 (2009.01)
 H04W 76/28 (2018.01)
 H04W 76/38 (2018.01)
 H04W 84/00 (2009.01)
 H04W 84/06 (2009.01)
 H04W 88/08 (2009.01)
 H04W 88/12 (2009.01)
 H04W 92/02 (2009.01)
 H04W 92/12 (2009.01)

(52) U.S. Cl.
 CPC ........... *H04W 24/02* (2013.01); *H04W 40/18* (2013.01); *H04W 40/20* (2013.01); *H04W 52/0216* (2013.01); *H04W 52/283* (2013.01); *H04W 56/002* (2013.01); *H04W 56/0005* (2013.01); *H04W 72/121* (2013.01); *H04W 72/1278* (2013.01); *H04W 76/28* (2018.02); *H04W 76/38* (2018.02); *H04W 84/005* (2013.01); *H04W 84/06* (2013.01); *H04W 88/08* (2013.01); *H04W 88/12* (2013.01); *H04W 92/02* (2013.01); *H04W 92/12* (2013.01); *Y02D 30/70* (2020.08)

(58) Field of Classification Search
 CPC .. H04B 7/14–195; H04B 17/0082–409; H04L 41/08; H04L 41/0893; H04W 8/22–245; H04W 24/02–10; H04W 28/02–26; H04W 36/0005–385; H04W 40/005–38; H04W 52/02–60; H04W 56/0005–0095; H04W 72/002–14; H04W 76/10–50; H04W 84/005–22; H04W 88/005–188; H04W 92/02–24; Y02D 30/70
 See application file for complete search history.

(56) References Cited

U.S. PATENT DOCUMENTS

| | | |
|---|---|---|
| 2012/0264449 A1 | 10/2012 | Kazmi et al. |
| 2012/0320923 A1* | 12/2012 | Vasseur ................. H04W 40/22 |
| 2013/0242825 A1* | 9/2013 | Farhadi ............... H04W 72/121 |
| 2014/0003234 A1* | 1/2014 | Chou ...................... H04W 4/70 |
| 2015/0263836 A1 | 9/2015 | Kim |
| 2016/0157163 A1 | 6/2016 | Lee et al. |
| 2016/0373971 A1* | 12/2016 | Kulal .................... H04W 24/02 |
| 2020/0059407 A1* | 2/2020 | Lu ......................... H04W 28/16 |

* cited by examiner

METHOD AND MANAGING MODULE FOR ENABLING MANAGEMENT OF OPERATION OF NETWORK NODE

CROSS REFERENCE TO RELATED APPLICATION(S)

This application is a 35 U.S.C. § 371 National Stage of International Patent Application No. PCT/SE2017/051141, filed Nov. 17, 2017, designating the United States.

TECHNICAL FIELD

Embodiments herein relate to wireless communication systems, such as cellular networks. In particular, a method and a managing module for enabling management of operation of a network node in a network are disclosed. A corresponding computer program and a computer program carrier are also disclosed.

BACKGROUND

It is known to use micro-aircrafts as flying base stations of a cellular network in order to provide connectivity in e.g. remote areas, disaster regions when stationary base stations have been knocked down, war zones, remote locations etc.

However, previously it has been assumed that base stations and relays are located at fixed location. For scenarios involving communication with sensors, this assumption has excluded use cases where micro-aircrafts, aka drones, are used in connection with sensor communication.

Therefore, consider a wireless communication system that may comprise one or more drone base stations, i.e. drones provided with the functionality of a base station. A reason for using drones base stations may be that the area in which coverage is required may be remote from any other infrastructure, i.e. a cable connected base station would not be economically feasible. The wireless communication system may use emerging category narrow band (Cat-NB) as proposed by an organization referred to as third generation partnership project (3GPP). A so called backhaul of the wireless communication network may be provided by means of a microwave network, one or more relays for connecting to a cable based base station, a satellite communication network or the like. Cat-NB implies extreme battery saving using so called extended discontinuous reception (eDRX), which is a method to manage the time a terminal is in contact with the wireless communication system, where the time between paging intervals may be extended to several hours or days. The drone base stations may provide connectivity for a plurality of internet of things (IoT) devices. Each IoT device may include a sensor for enabling the IoT device to report data, such as temperature, amount of rain, images, videos, etc.—via the drone base station—to a server handling the data. Typically, the IoT device reports infrequently, such as once every hour, once every day, once every second day, etc. using for example eDRX. The drone base station thus needs to be ready to receive transmissions from the IoT devices whenever they transmit data.

The drone base station can have a battery for powering its means of mobility, such as a rotor. The battery will need to be replaced or charged when its power level is below a certain threshold.

A problem may thus be how to make it possible to operate the wireless communication system in a more power efficient manner. In particular, it may be a problem how to operate the drone base station in a more power efficient manner, e.g. in terms of power used for wireless communication with the IoT device and/or in terms of power used for mobility purposes.

SUMMARY

An object may thus be to enable efficient use of power in a network node, such as the drone base station of the abovementioned kind, a stationary base station or the like.

According to an aspect, the object is achieved by a method, performed by a managing module, for enabling management of operation of a network node in a network. Wireless devices are servable by the network node. Each wireless device of the wireless devices is configurable with a respective indication of an interval for reporting of data to the network node. A set of indications of intervals for reporting of data comprises each respective indication for the wireless devices. The managing module obtains the set of indications of intervals for reporting of data. Furthermore, the managing module organises the wireless devices into a set of one or more groups of wireless devices based on the set of indications of intervals for reporting of data. Moreover, the managing module determines information for aligning reporting from the wireless devices within each group of the set of one or more groups. The managing module provides the information for aligning reporting, whereby the information for aligning reporting is accessible by the network.

According to another aspect, the object is achieved by a managing module configured for enabling management of operation of a network node in a network. Wireless devices are servable by the network node. Each wireless device of the wireless devices is configurable with a respective indication of an interval for reporting of data to the network node. A set of indications of intervals for reporting of data comprises each respective indication for the wireless devices. The managing module is configured for obtaining the set of indications of intervals for reporting of data. The managing module is configured for organising the wireless devices into a set of one or more groups of wireless devices based on the set of indications of intervals for reporting of data. The managing module is configured for determining information for aligning reporting from the wireless devices within each group of the set of one or more groups. The managing module is configured for providing the information for aligning reporting, whereby the information for aligning reporting is accessible by the network.

According to further aspects, the object is achieved by a computer program and a computer program carrier corresponding to the aspects above.

Since the managing module organizes the wireless device into the set of one or more groups of wireless devices based on the set of indications of intervals, each group of the set of one or more groups may comprise those wireless devices that have similar intervals for reporting of data. As an example, a first and a second wireless device may each report data every fifth minute. The first wireless device may report data at 12.00, 12.05, 12.10 etc. and the second wireless device may report data at 12.02, 12.07, 12.12 etc. In this case, there is a delay of 2 minutes from reporting of the first wireless device to reporting of the second wireless device. Reporting from the first and second wireless device may thus need to be handled separately by the network node. This is not efficient for the network node from a power consumption perspective. In order to allow power efficient handling of these two wireless devices, the reporting every fifth minute of the first and second wireless devices may need to be synchronized and/or in pace such that the reporting occurs simultaneously, or at least occur within a specific time period. The network node may then handle the reporting of these two wireless devices for example when being active, as opposed to idle, when being sufficiently close to the first and second wireless devices or the like. The managing module may thus determine the information for aligning reporting from the wireless devices within each group of the set of one or more groups. As a result, the reporting from e.g. the two wireless devices may become synchronized, or at least partly synchronized for some time, when the network applies the information for aligning reporting to the wireless devices in each group.

Since the reporting is handled in close temporal proximity with each other, the network node may more efficiently use its power, e.g. one or more of saving signaling resources, power used for mobility purposes of the network node, transmit power, and the like. Accordingly, the above mentioned object may be achieved.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
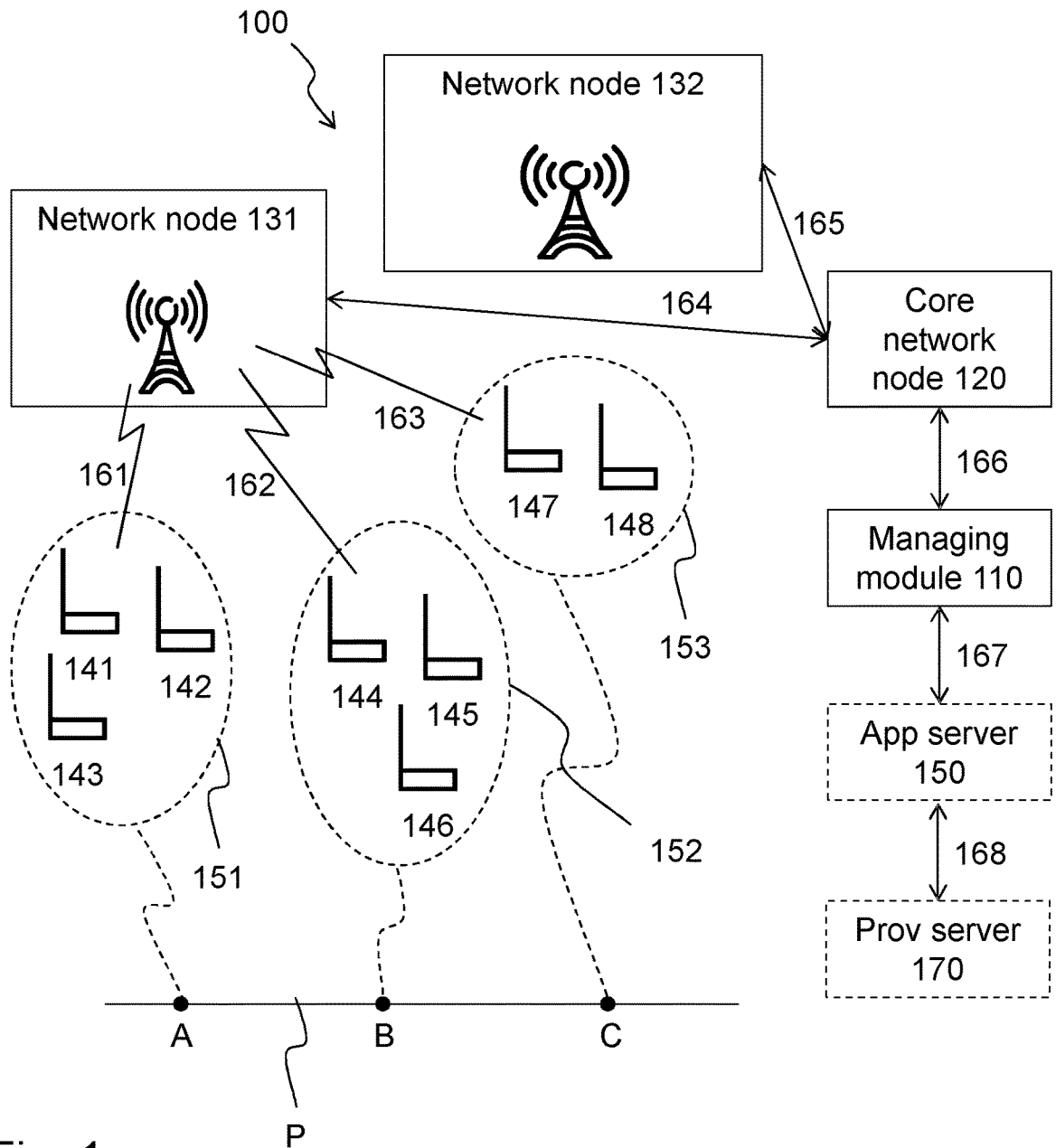
FIG. 1 is a schematic overview of an exemplifying network in which embodiments herein may be implemented.

Throughout the following description, similar reference numerals have been used to denote similar features, such as nodes, actions, modules, circuits, parts, items, elements, units or the like, when applicable. In the Figures, features that appear in some embodiments are indicated by dashed lines.

FIG. 1 depicts an exemplifying network 100 in which embodiments herein may be implemented. In this example, the network 100 is a long term evolution (LTE) network.

In other examples, the network 100 may be any cellular or wireless communication system, such as a Universal Mobile Telecommunication System (UMTS), a global system for mobile communication (GSM) and worldwide interoperability for microwave access (WiMAX) or the like.

The network 100 may be said to comprise a managing module 110 which may perform an exemplifying method according to the embodiments herein. The managing module 110 may be operated as a separate physical entity, as a virtual machine, as a process thread running on a processor that e.g. also handles other functions.

Furthermore, the network 100 may comprise a core network node 120, such as Mobility Management Entity (MME), Evolved Packet Gateway (EPG), Service Aware Policy Controller (SAPC), an application server(s) and the like.

The network 100 may also comprise a network node 131 and/or a further network node 132. The network node 131 may be a radio network node 131 or a mobile radio network node 131 and/or the further network node 132 may be a further radio network node 132 or a further mobile radio network node 132.

The term "network node" may refer to a mobile base station, a base station, a mobile communication network interface, a mobile interface, a mobile radio interface, or a relay station comprised in a mobile vehicle, such as a drone, airplane, car, train, etc. The network node may be comprised in the mobile vehicle in that the base station is carried by the mobile vehicle, integrated with the mobile vehicle or the like in such a manner that the network node 131 is movable together with the vehicle. The base station may be a radio network controller, a NodeB, an evolved NodeB, a radio base station, a relay station, or the like.

Additionally, wireless devices 141-148, i.e. a plurality of wireless device 141-148, may be able to connect with, such as attach to, register with, etc., the network node 131.

The wireless devices 141-148 may be servable by the network node 131. Each wireless device 141-148 of the wireless devices 141-148 may be configurable with a respective indication of an interval for reporting of data to the network node. A set of indications of intervals for reporting of data may comprise each respective indication for the wireless devices 141-148. This means for example, in case of eight wireless devices 141-148 as in FIG. 1, there may be eight indications, i.e. one for each wireless device. These eight indications may be different, similar or even identical. The network node 131 may serve further wireless devices (not shown) that may be excluded.

The term "wireless device" may refer to a user equipment, a machine-to-machine (M2M) device, a mobile phone, a cellular phone, a personal digital assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor device may detect any kind of metric, such as wind, temperature, air pressure, humidity, light, electricity, sound, images etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

Additionally, an application server 150 is shown in FIG. 1. The application server 150 may receive reporting from the wireless devices 141-148 according to the set of indications of intervals for reporting of data, e.g. so called payload data, user data or the like. The reported data is thus different from data that is commonly and periodically reported in the network for purpose of transmission control, such as radio resource control signaling, heart-beat or keep-alive messages or the like.

FIG. 1 further illustrates a set of one or more groups 151, 152, 153 of the wireless devices 141-148. This description will refer to the set of one or more groups 151-153 further below.

In some examples, a provisioning server 170 may be provided. The provisioning server 170 may handling provisioning, e.g. set up and configuring, of the wireless devices 141-148. For example, reporting intervals, e.g. in terms of eDRX, may be provided to the wireless devices 141-148 by the provisioning server 170.

The network node 131 may communicate 161-163 with the wireless devices 141-148. This communication may include user transmissions and/or control transmissions. The user transmissions may include user data, payload data, content data etc. The control transmissions may include control information relating to e.g. scheduling, authentication, mobility, transmit power etc. The user transmissions are only relevant in case the first wireless device is in a cellular mode. The communication may include uplink transmission and/or downlink transmission.

Moreover, the core network node 120 may communicate 164, 165 with the network nodes 131, 132 typically via a so called backhaul link. Furthermore, the core network node 120 may communicate 166 with the managing module 110, e.g. over an Internet Protocol (IP) connection using application protocols like representational state transfer (REST), Cobra, Diameter or the like. Additionally, the managing module 110 may communicate 167 with the application server 150. The provisioning server may communicate 168 with the managing module 110.

In one example of the embodiments herein, at least one group of wireless devices is formed based on the wireless devices' intervals for reporting of data, such as paging interval. Then, the reporting of data for one such group may be synchronized, or at least semi-synchronized, in such a way that the network node 131 can be directed to a physical location where the network node 131 may receive the signals for reporting from the wireless devices of the aforementioned group. Semi-synchronized may refer to that the wireless devices are synchronized within a certain margin, i.e. not perfectly synchronized. When semi-synchronized, there may be a drift such that the reporting of the wireless devices may need to be aligned again, e.g. when the margin isn't satisfied.

Figure 2:
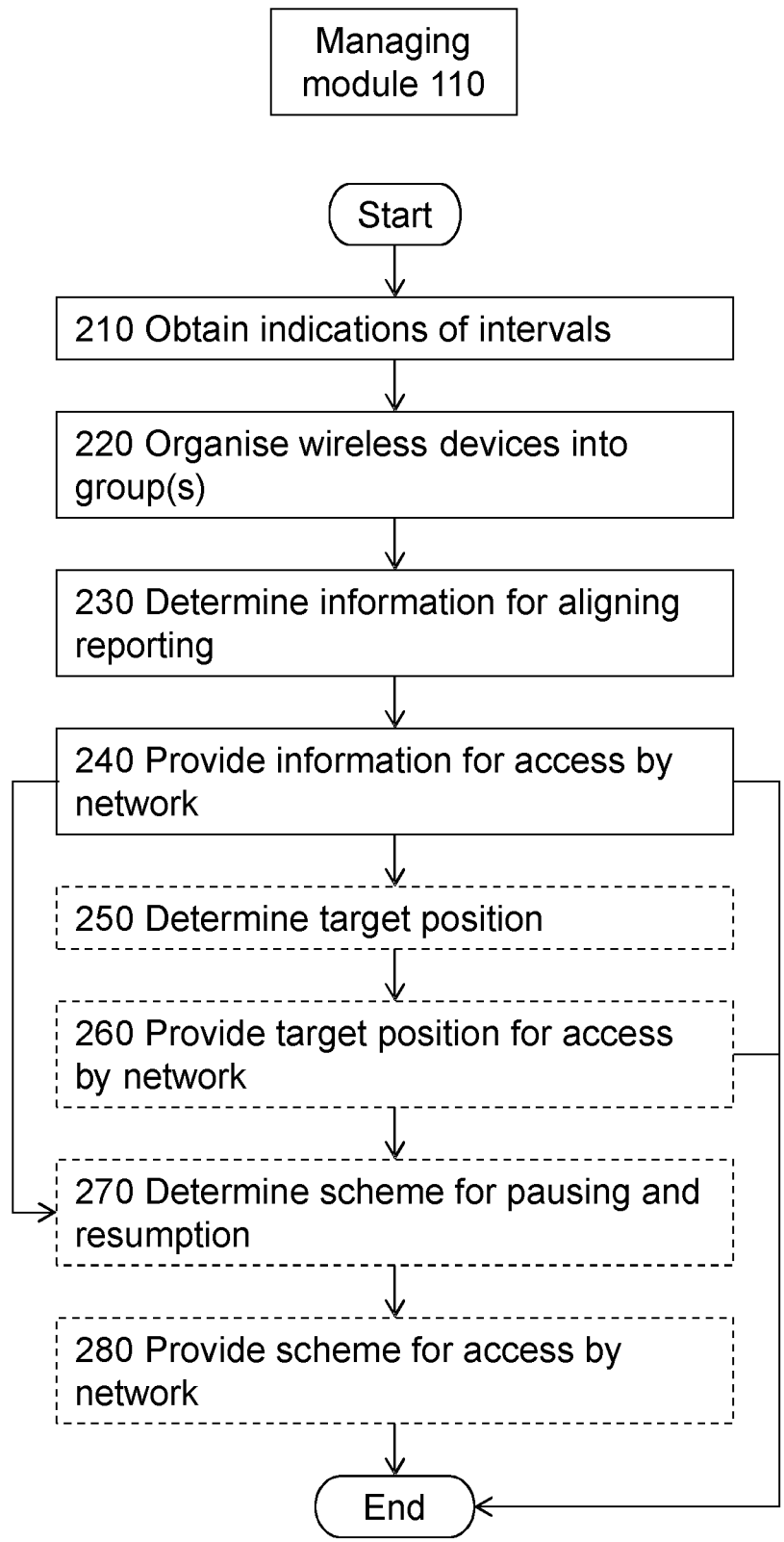
FIG. 2 is a flowchart illustrating embodiments of the method in the managing module.

Now in order to illustrate further exemplifying methods according to embodiments herein, FIG. 2 illustrates an exemplifying flow chart. The embodiments herein may be implemented in the managing module 110. Thus, the managing module 110 performs a method for enabling management of operation of the network node 131 in the network 100.

One or more of the following actions may be performed in any suitable order.

210. In order to perform action 220 below, the managing module 110 obtains the set of indications of intervals relating to the wireless devices 141-148 for reporting of data. In this manner, the managing module 110 is made aware of desired or configured reporting intervals relating to the wireless devices 141-148.

A respective indication of the intervals for reporting of data is thus associated with a respective wireless device. As an example, the set of indication may be 3, 4, 3, 20, 22, 25, 10, 10, 12, where these numbers indicate seconds, hours, days or the like. That is, as an example, there may be a wireless device that reports data every $3^{rd}$ second, another wireless device that reports data every $4^{th}$ second, a further wireless device that reports data every $3^{rd}$ second, etc.

The set of indications of intervals for reporting may be received from the application server 150, the core network node 120, or the like. Typically, the application server 150 may transmit the set of indications of intervals that are desired and the core network node 120 may transmit the set of indications of intervals that are configured in the wireless devices 141-148.

The managing module 110 may obtain the set of indications of intervals by obtaining information, referred to as "organising information", since it may be used by the managing module 110 when performing action 220 below.

This may mean that the information, i.e. the organising information, may comprise the set of indications of intervals. Furthermore, the information may comprise one or more of:

a set of indications about respective positions of the wireless devices 141-148, a path along which the network node 131 is capable of travelling, and the like.

The path may refer that the network node 131 may travel between locations of two different groups 151-153 of wireless device 141-148. A purpose of travelling between locations of the two different groups 151-153 may be that the network node 131 may alone serve the two different groups 151-153, whereas if the network node 131 would not travel between the locations, two network nodes would be required in order to serve a respective one of the two different groups. See for example, path P in FIG. 1.

220. Now that the managing module 110 is made aware of the set of indications of intervals for reporting of data, the managing module 110 organises the wireless devices 141-148 into a set of one or more groups 151-153 of wireless devices 141-148 based on the set of indications of intervals for reporting of data.

As above, the set of indication may be 3, 4, 3, 20, 22, 25, 10, 10, 12, where these numbers indicate seconds, hours, days or the like. The managing module 110 may for example organise wireless devices 141-148 that have reporting intervals of about 3 seconds into a first group and organise wireless devices 141-148 that have reporting intervals of about 11 seconds into a second group. This means for example that wireless device associated with indications 3, 4, and 3 may belong to the first group and the wireless devices associated with indications 10, 10 and 12 may belong to the second group. In this example, a margin of 1 second compared to the reporting interval of the group to be formed has been used. The first group comprises wireless devices that have a reporting interval of 2-4 s and the second group comprises wireless devices that have a reporting interval of 10-12 s.

With the particular embodiments, the managing module 110 may organise the wireless devices 141-148 into a set of one or more groups is based on the information, i.e. the organising information. Expressed differently, the organising 220 of the wireless devices 141-148 into a set of one or more groups may be based on the information. As an example, the managing module 110 may thus organise the wireless devices 141-148 into the set of one or more groups based on the set of indications of intervals and the set of indications about respective positions. It may be that the managing module 110 first organises the wireless devices in to groups based on their positions and then within each group, formed based on position, the managing module 110 forms sub-groups of said each group where the set of indications of intervals is used as selective criteria for the sub-groups. However, when a coverage area of the network node 131 is large enough to provide connectivity for all wireless devices 141-148 at the same time, given that the position of the network node 131 is suitable, grouping based on position may not need to be performed.

230. Even if two indications of intervals are similar, it may be that the associated wireless devices do not transmit, e.g. report data, simultaneously. Consider, for example, a first wireless device that reports at XX:10 hours and a second wireless device that reports at XX:40 hours. The indications of the first and second wireless device are identical, but reporting occurs at different times. Therefore, the managing module 110 checks if the reporting occasions may need to be synchronized, or at least semi-synchronized.

The managing module 110 determines information for aligning reporting from the wireless devices 141-148 within each group of the set of one or more groups. In some examples, the managing module 110 determines a respective eDRX setting to be used for the wireless devices in each group of the set of one or more groups.

240. In order for the network 100, such as the core network node 120, the network node 131 and the like, to be able to apply the information for aligning reporting, the managing module 110 provides the information for aligning reporting. Accordingly, the information for aligning reporting is accessible by the network 100 upon completion of action 240.

The network 100 may now use the information in order to align reporting. Thus, the network node 131 may efficiently use its power since the reporting may be aligned when the network applies the information for aligning reporting. This may allow the network node 131 to be idle between reporting occasions, e.g. by appearing at a position for receiving the reporting only when reports are expected to be transmitted from the wireless devices, e.g. comprised in a certain group. When the network node 131 is idle, power consumption thereof is reduced, e.g. due to that the network node 131 stops, i.e. does not move, lands on the ground or the like.

This may be particularly useful in scenarios where wireless devices, such as sensors, are deployed at fixed physical positions, e.g. on a bridge or other types of monitoring stations, especially in remote areas. In these scenarios, it would often not be economically feasible to provide a remotely located network which is always ready to receive signal for reporting. Clearly, this would be waste of energy, when the remotely located network is assumed to serve only the wireless devices, e.g. the sensors.

In some examples, the set of one or more groups may comprise at least two groups. The managing module 110 may instruct the network 100 to efficiently use the network node 131 to serve both said at least two groups, which may be located at different locations. The network node 131 is efficiently used because when one of the groups is not transmitting, the network node 131 may be used to receive transmissions from the other of said at least two groups. This is more efficient than using two different network nodes, one for each group when the groups are located at different locations. Time, during which the network node 131 is not used, may thus be reduced.

When the groups are located at the same location, the same or similar benefits as with one group may be achieved, i.e. so called idle time may be increased.

In some special embodiments relating to actions 250 and 260 and/or actions 270 and 280 below, a set of parameters may comprise one or more of:

the set of indication about respective positions of the wireless devices 141-148, a consumption of power used for mobility of the network node 131, a position of a core network node 120 serving the network node 131, a position of a further network node 132 providing the network node 131 with connectivity towards a core network node 120, a signal strength of a further module network node 132 providing the network node 131 with connectivity towards a core network node 120, an indication of remaining travel distance, an indication of remaining battery power, and the like.

The indication of remaining travel distance may refer to that the network node 131 may keep track of estimated travel distance that may be covered based on remaining power available for mobility of the network node 131, e.g. remaining battery power, remaining fuel etc.

According to some of the special embodiments, referred to as "positioning embodiments", action 250 and action 260 may be performed.

250. According to the positioning embodiments, the managing module 110 may determine a target position for the network node 131 based on the set of parameters. This may mean that the target position may be determined such as to reduce one or more of the remaining travel distance, the consumption of power used for mobility of the network node 131 and the like and/or such as to increase the remaining battery power etc. In many cases, there may need to be a trade-off between opposing requirements. E.g. it may typically be that when the target position is determined such that the remaining travel distance is decreased, energy required for transmission of data may increase.

In this manner, the network 100 may instruct the network node 131 to assume the target position, or attempt to assume the target position.

The target position may also be associated with a time stamp and a duration which indicates when the network node 131 may be located at the target position.

As an example, the network node 131 may thus, i.e. upon instruction from the network 100, e.g. the core network node 120, travel to the target position in advance of a reporting occasion, i.e. when a particular group of wireless devices intend to report their data to the application server 150. When being located at the target position, the network node 131 may be able to receive signalling relating to the reporting from the particular group of wireless devices.

This may mean that the network node 131 may be instructed to position itself with regard to known or reported positions of the wireless devices in the particular group and/or signal strength of the further network node 132.

Additionally, the network node 131 may take its own energy consumption into account, e.g. in terms of the power used for mobility of the network node 131 and/or power used for transmission purposes and/or the like. A travel time, such as flight time or the like, to a recharging station and/or to a station for refilling of fuel may thus be taken into account when the managing module 110 determines the target position.

In another example, the network node 131 may determine the target position based on the position of the further network node 132 providing the network node 131 with connectivity towards the core network node 120. Hence, if the next network node, e.g. relay, is also carried by a vehicle without fixed position, the network node 131 may be positioned according to the signal strength, or position, of the wireless devices of the particular group and the further network node 132 in a chain of network nodes towards the core network node 120.

If the further network node 132 is also receiving signals from wireless devices (not shown) with fixed positions, the determining of the position of the network node 131 may be co-varied with the reporting intervals of the particular group of wireless devices so that the target position reduces power consumption for the chain of network nodes.

In some examples, the set of one or more groups of wireless devices 141-148 comprises at least two groups of wireless devices 141-143, 144-146.

With these examples, the managing module 110 may further determine the target position of the network node 131 based on a respective parameter relating to reporting intervals for each group of said at least two groups of wireless devices 141-143, 144-146, a respective parameter relating to position for each group of said at least two groups of wireless devices 141-143, 144-146, and the like.

In more detail, there may e.g. be a first group of wireless devices 141-143 transmitting at XX:15 hours, and a second group of wireless devices 144-146 transmitting at XX:30 hours. The respective parameter relating to position of the first group and second group may be determined as average position of the wireless devices 141-143, 144-146 of the first and second groups, respectively.

260. According to the positioning embodiments, the managing module 110 may provide the target position, whereby the target position is accessible by the network 100. In some examples, the managing module 110 may transmit the target position to the core network node 120, either upon request or without request from the core network node 120.

According to some of the special embodiments, referred to as "core embodiments", action 270 and action 280 may be performed.

270. According to the core embodiments, the managing module 110 may determine a scheme for pausing and resumption of a network slice related to each group of wireless devices 141-148 based on the set of indication of intervals for reporting of data and the information for aligning reporting. As is known in the art, a network slice may refer to a logical infrastructure that is formed on top of a physical infrastructure. In this manner, the physical infrastructure may be shared between different slices according to requirements of the different slices. In this manner, flexible use of the physical infrastructure is enabled.

It may be assumed that the set of one or more groups of wireless devices 141-148 comprises at least two groups of wireless devices 141-143, 144-146, e.g. a first and a second group of wireless devices 141-143, 144-146. Further, the first groups of wireless device 141-143 may be served by a first network slice of the network 100 and the second group of wireless devices 144-146 may be served by a second network slice of the network 100.

Then, the managing module 110 may determine the scheme for pausing and resumption of the network slice related to each group of wireless devices, such as the first and second groups. This may for example mean that the first network slice may be active only when the first group is about to report and the second network slice may be active only when the second group is about to report. In this manner, network slices may be instantiated and released, such as deleted, terminated or the like, according to required usage. Accordingly, hardware resources, such as computing resources, central processing unit (CPU) resources, memory resources or the like may be shared by the first and second network slice, i.e. when the first network slice is active, the second network slice is idle and when the first network slice is idle, the second network slice is active.

For example, the first network slice may be Cat-NB slice and the second network slice may be Cat-M1 slice. Hence, the Cat-NB slice may be idle during operation of the Cat-M1 slice and vice versa.

In this fashion, dynamic reconfiguration of the network 100 may be achieved. The dynamic reconfiguration of the network 100 may thus refer to that resources are used by different slices at different time instances. Thereby, resources—such as the aforementioned computational resources, energy resources or the like—may be saved and/or more efficiently used.

280. According to the core embodiments, the managing module 110 may provide, to the core network node 120, the scheme for pausing and resumption of the network slice, whereby the scheme is accessible by the network 100. In some examples, the managing module 110 may transmit the scheme for pausing and resumption of the network slice to the core network node 120, either upon request or without request from the core network node 120.

According to a further example, assume that the set of one or more groups 151, 152, 153 of wireless device 141-148 comprises three groups of wireless devices. The three groups 151, 152, 153 may be located along a path P at positions A, B and C, respectively. See reference numerals in FIG. 1. Assume that going from A to B to C consumes more energy than going form C to B to A, e.g. due to wind direction, uphill/downhill, upstream/downstream etc. as appropriate depending on a vehicle carrying the network node 131. In the following, it is further assumed that the path mainly extends in a west-to-east direction and a wind direction from east to west causes higher energy consumption when the network node 131 travels from west to east and the positions are in order from west to east A, B and C.

Hence, when the wind blows from east to west, the network node 131 will be carried from C to B in 10 minutes and from B to A in 10 minutes. This means that if the wireless devices in a group at position C should start operating, i.e. send reports, at 16:00, the wireless device in a further group at position B should start at 16:10, and a still further group at position A at 16:20. However, when the wind blows from west to east and the network node 131 starts at bridge A at 16:00, take bridge B at 16:10, and bridge C at 16:20. Unless the groups may be reconfigured to take the prevailing wind direction on the following day into account, only the wireless devices at position B will ever be able to transmit, as they will always be transmitting at 16:10. But if the wind direction is known the day before, the wireless devices may be reconfigured when reporting data at the day before so that timing of reporting allows for energy efficient travelling along the path. Hence, in this manner, ambient conditions, such as weather conditions, wind direction, geography etc., may be taken into account.

According to the embodiments herein, standard functions, such as the provisioning of wireless devices 141-148 with appropriate eDRX values, may be used to leverage power efficiency in the network 100, such as the network node 131, based on information provided by the managing module 110.

Figure 3:
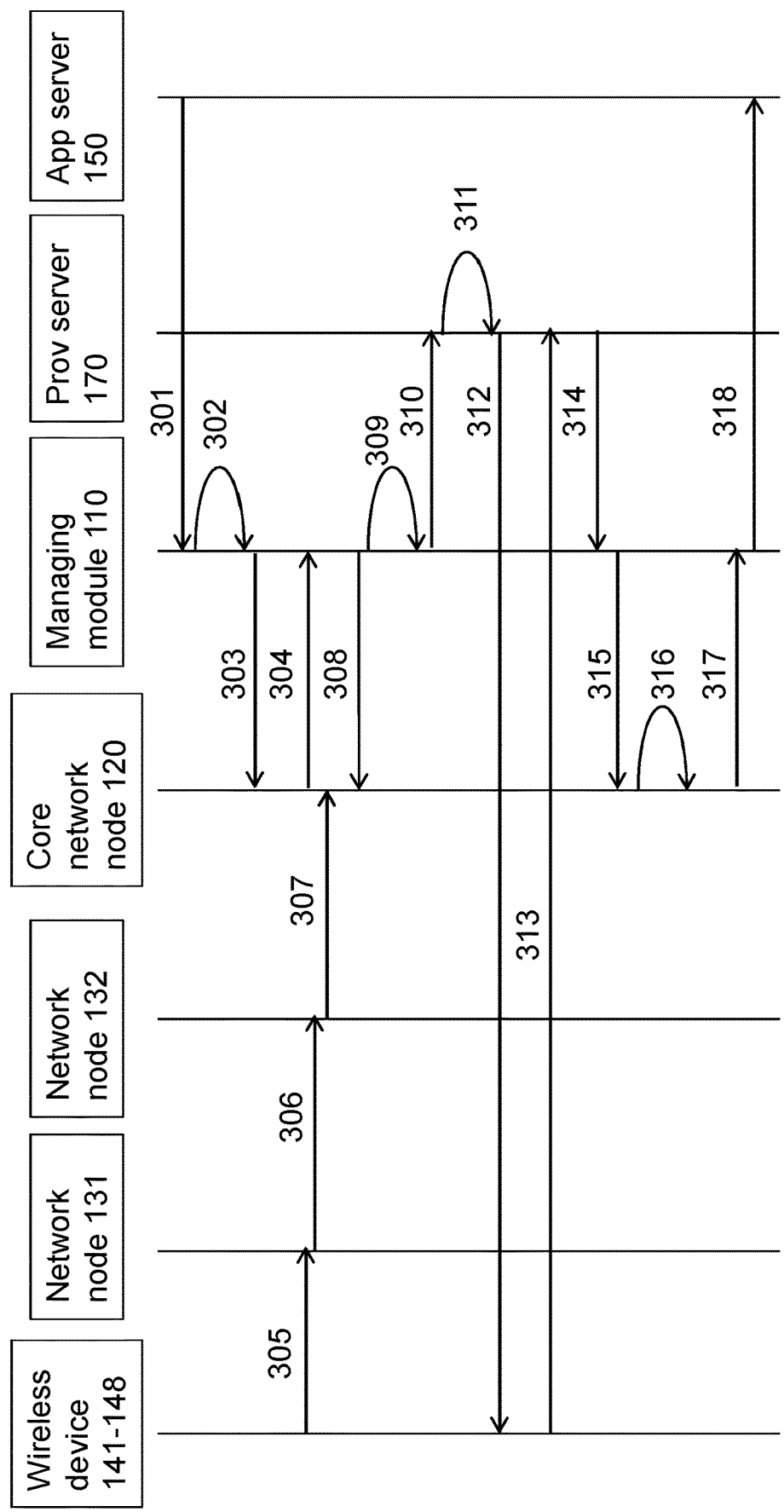
FIG. 3 is a combined signaling and flowchart illustrating exemplifying methods relating to enabling management of operation a network node.

FIG. 3 illustrates one exemplifying method for enabling management of operation of the network node 131, when implemented in the network 100 of FIG. 1.

The following prerequisites may apply. The wireless devices 141-148 may be provisioned with eDRX values using e.g. open mobile alliance (OMA) lightweight device management (DM) protocol. Exact positions of the wireless devices 141-148 are unknown until the wireless devices 141-148 attaches to the network 100 for the first time. This also implies that some entity will have to be able to allow the wireless devices 141-148 to attach to the network 100. That entity may be a vehicle carrying a base station or the entity may be a macro base station of the network 100.

In the following, the network node 131 may be seen a collector of information from the wireless devices 141-148 and the further network node 132 may be seen a relay for relaying the collected information towards the core network node 120.

One or more of the following actions may be performed in any suitable order.

301. The application (app) server 150 registers a group 151, 152, 153 of wireless devices 141-148 in the managing module 110. This request includes the preferred time intervals for data collection, either in terms of time duration, or if the measurements is dependent e.g. of the time of day, the precise times.

It is also possible that the flow is reverse, that is the application server 150 may query the managing module 110 whether there are any wireless devices 141-148 in a certain area, which is able to provide measurements; or it may query only for measurements. Assignment of wireless device into groups according to their position and/or reporting intervals may be performed by the managing module 110.

The purpose of this action is that the managing module obtains the set of indications of intervals as in action 210 above.

302. The managing module 110 may check whether there has already been determined some groups and/or target positions in relation to the wireless device under consideration.

303. The managing module 110 may query the core network node 120, such as a user data collector (UDC) server, to determine whether the wireless devices 141-148 are already registered, e.g. attached to the network 100, registered with a server, such as a hypertext marked-up language transfer protocol dynamic streaming (HDS) server, associated with the network 100 or the like.

304. The core network node 120 may respond with information about the wireless device(s) 141-148. If steps 305 through 307 have already occurred, the method proceeds to step 308. If steps 305 through 307 have not yet occurred, the managing module 110 may continue to query the core network node 120 for the registration of the wireless device(s) 141-148 at regular intervals.

305. The wireless device 141-148 registers with the network node 131.

306. The network node 131 forwards the registration to the further network node 132.

307. The further network node 132 may forward the registration to the core network node 120.

308. The managing module 110 may query the core network node 120, such as the UDC server, whether the wireless device 141-148 has registered in the network. The request may include the position of the wireless device 141-148.

309. The managing module 110 may determine the group assignment of the wireless device 141-148, including its eDRX interval. This action may be similar to action 220 and 230 above.

Since the grouping may be performed such that most wireless devices 141-148 in an area have the same or close eDRX intervals, the group assignment is also dependent on the characteristics of the further network node 132 node, i.e. the number of wireless devices it can handle simultaneously. Hence, the collection of information from the network node 131 and the further network node 132 may preferably take place before the provisioning, i.e. the grouping and determining of the information for aligning reporting of the wireless device(s) 141-148.

310. The managing module 110 may request provisioning of eDRX interval and other related characteristics to the wireless device 141-148 from the provisioning (prov) server 170.

311. The provisioning server 170 may determine how to provision, i.e. how to set up and configure, the wireless device 141-148 based on its characteristics. For example, the provision may relate to which eDRX value the wireless device 141-148 may be provided with.

312. Using OMA Device Management or other standardized or relevant provisioning protocol, the provisioning server provisions the eDRX value to the wireless device 141-148.

313. The wireless device 141-148 may confirm the provisioning.

314. The provisioning server 170 may confirm provisioning to the managing module 110.

Alternatively, steps 305 through 314 in FIG. 3 may be omitted, and the position reported in step 301 or by out-of-band means (i.e. the operator fixating the device to its location registers the position, and brings back the registration report for a number of devices as a batch file). Assuming that the group members are all input manually into the managing module 110 and that the wireless devices 141-148 are configured manually at deployment however, the automated provisioning (this entire phase) is not necessary.

315. The managing module 110 may set the eDRX interval in the core network node 120. This action may be similar to action 240 above. Action 240 may be performed according to other manners such as by use of the provisioning server 170 as above.

316. The core network node 120 may set the eDRX interval as instructed by the managing module 110.

317. The core network node 120 may confirm setting of values to managing module 110.

318. The managing module 110 may inform collection interval/time to the application server 150.

Figure 4:
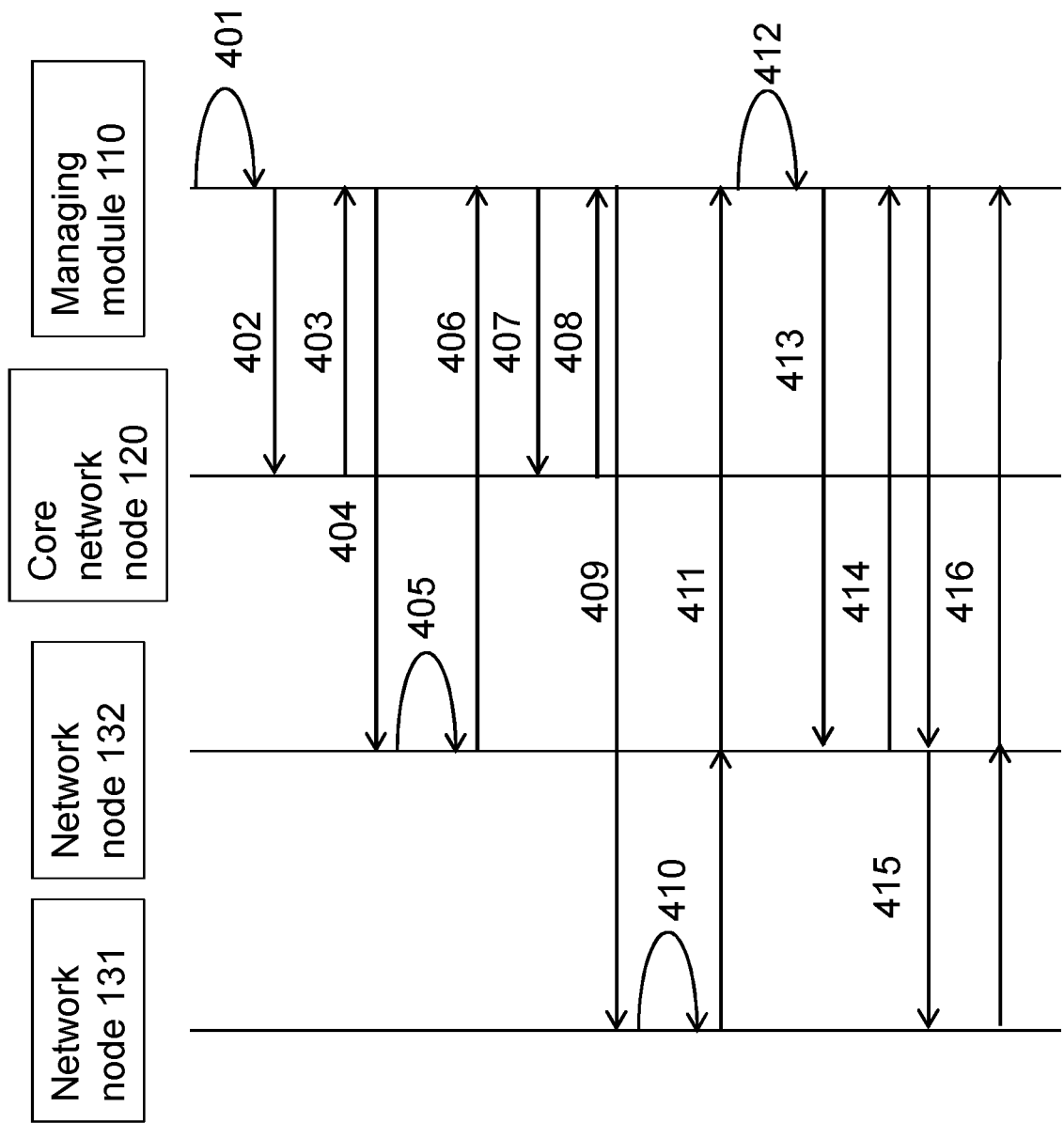
FIG. 4 is another combined signaling and flowchart illustrating exemplifying methods relating to information collection.

With reference to FIG. 4, an example for information collection is illustrated.

Before information, i.e. the reporting of data, can be collected from the sensors attached to the wireless device 141-148 through application data transmitted over control plane using Donas according to Cat-NB standards in 3GPP, the wireless device 141-148 may preferably be able to communicate with the network node 131 when the wireless device 141-148 becomes available. During an eDRX interval, the wireless device 141-148 is essentially offline, so the network node 131 needs to be positioned before the wireless device 141-148 becomes available, as the wireless device 141-148 may go offline again when it has sent its data.

Hence, the network node 131 may preferably be positioned appropriately relevant to the wireless device(s) 141-148 before they start transmitting. If there is a situation where multiple wireless devices 141-148 are continuously coming online, the position of the network node 131 may have to be adjusted so that the number of wireless devices 141-148 it covers is appropriate (e.g. if the network node 131 can only handle a certain number of connections from wireless devices 141-148 simultaneously). Hence, the managing module 110 may preferably be aware of the position and characteristics of the network node 131 and the further network node 132 (such as available energy to operate the carrier of the network node 131 into an appropriate position).

The characteristics of the network node 131 and the further network node 132 may comprise: 1) network-related capabilities, i.e. the ability to connect to wireless devices 141-148, the number of wireless devices 141-148 which can be simultaneously connected, the energy available for the reception of signals and their re-transmission from network node 131 to the further network node 132 (and to some relays 132); and 2) energy available to move the network node 131 around, i.e. the energy available to the vehicle carrying the network node 131, and the projected duration, which is also affected by factors like the weather etc.

To determine the energy available to move, the network node 131 may retrieve weather information and by itself determine an estimated duration corresponding to the available energy. For example, flying in hard winds requires more energy than flying when the air is still. Alternatively, the managing module 110 may determine the estimated duration based on input from the network node 131 regarding energy and other information like wind strength, direction etc. and external information, such as the weather forecast for the location.

One or more of the following actions may be performed in any suitable order.

401. The managing module 110 determines a need for data collection from the network node 131 and the further network node 132. The need may be determined by the managing module 110, when it receives a command to initiate information collection from the application server 150.

402. The managing module 110 sends a request to the core network node 120, such as the UDC server, for information regarding the further network node 132.

403. The core network node 120 may send a response to the request.

404. The managing module 110 may send a request to the further network node 132 via nodes in the core network node 100, or directly to the network node 131. The request may be a request for any information, such as position, policy for network access, allocated or available bandwidth, etc.

405. The further network node 132 may compute information.

406. The further network node 132 may reply with requested information.

This may take the form of pre-defined messages, i.e. there is no need to request the information every time, you can just request the previous information set again, or similar.

407. The managing module 110 may send a request to the Core Network (UDC and/or location server) for information regarding the network node 131.

408. A response to the request may be transmitted.

409. The managing module 110 may send request to network node 131 for information.

410. The network node 131 may compute information, i.e. the information requested in action 404.

411. The network node 131 may reply with requested information.

412. The managing module 110 may compute whether the network node 131 and/or the further network node 132 may be requested to change their position (or components thereof), including the possibility to redirect them to their base and request a new network node 131 and/or the further network node 132. This action may be similar to action 250 above.

413. The managing module 110 may send directions to the further network node 132.

414. The further network node 132 may respond with an acknowledgment.

415. The managing module 110 may send directions to the network node 131. This action may be similar to action 260 above.

416. The network node 131 may transmit an acknowledgment to the managing module 110, e.g. via the network node 132, i.e. a relay.

Figure 5:
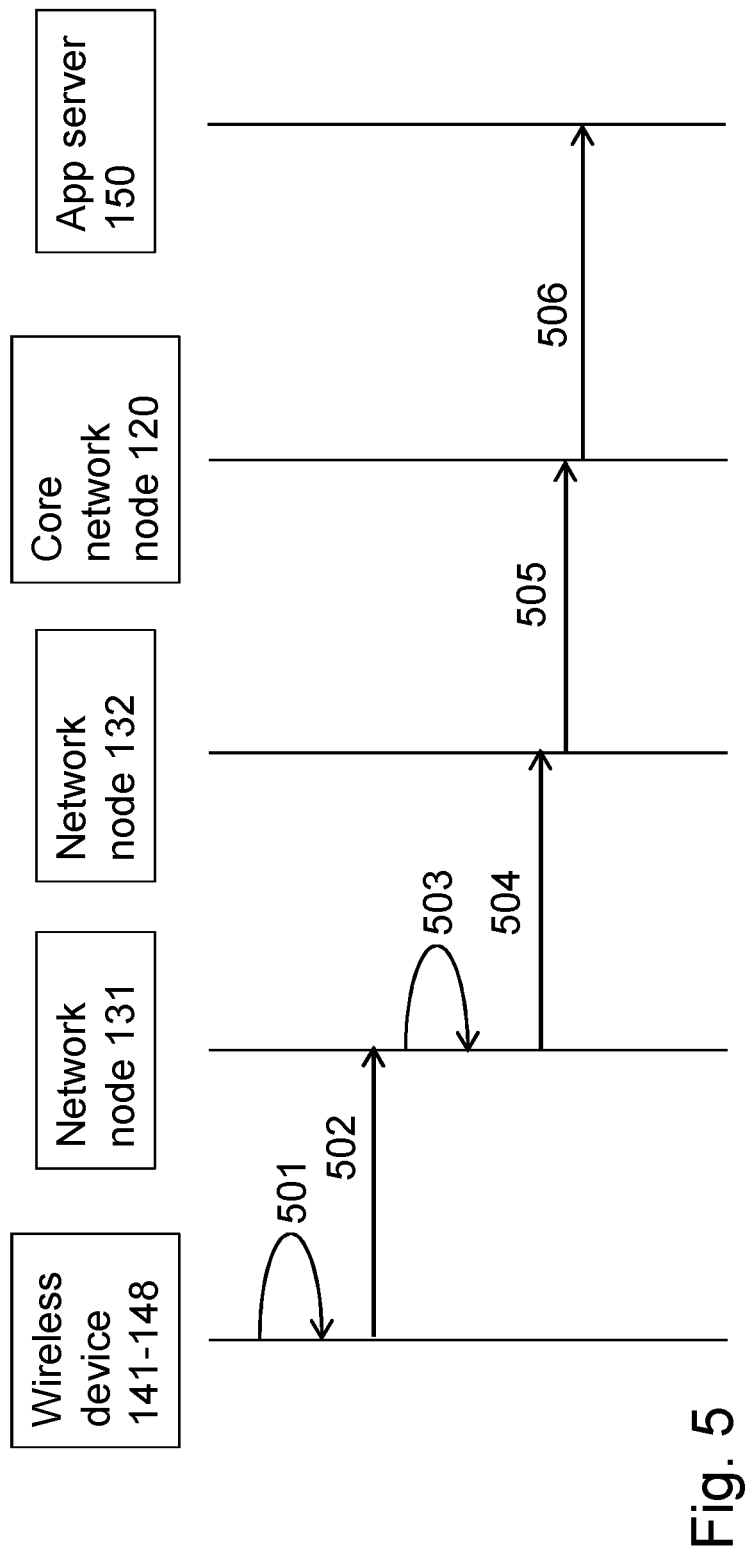
FIG. 5 is a further combined signaling and flowchart illustrating exemplifying methods relating to data reporting.

Furthermore, as yet another example, subsequent to at least one of the aforementioned examples, the application server 150 may receive data from at least one of the wireless devices 141-148 as will be described with reference to FIG. 5.

Hence, one or more of the following actions may be performed in any suitable order.

501. The wireless device 141-148 typically sleeps between reporting occasions, e.g. between paging intervals.

502. When it is time to report, e.g. when the paging interval opens, the wireless device 141-148 may transmits a report, e.g. transmit the data of the report.

503. The network node 131 may receive the data, since it has been configured according to the information provided by the managing module 110 as described e.g. with reference to FIG. 2.

504. The network node 131 may forward the data to the further network node 132, which acts as a relay.

505. The further network node 132 may forward the data to the core network node 120, such as a particular slice relevant for a group to which the wireless device 141-148 belongs.

506. The core network node 120 may forward the data to the application server 150.

Figure 6:
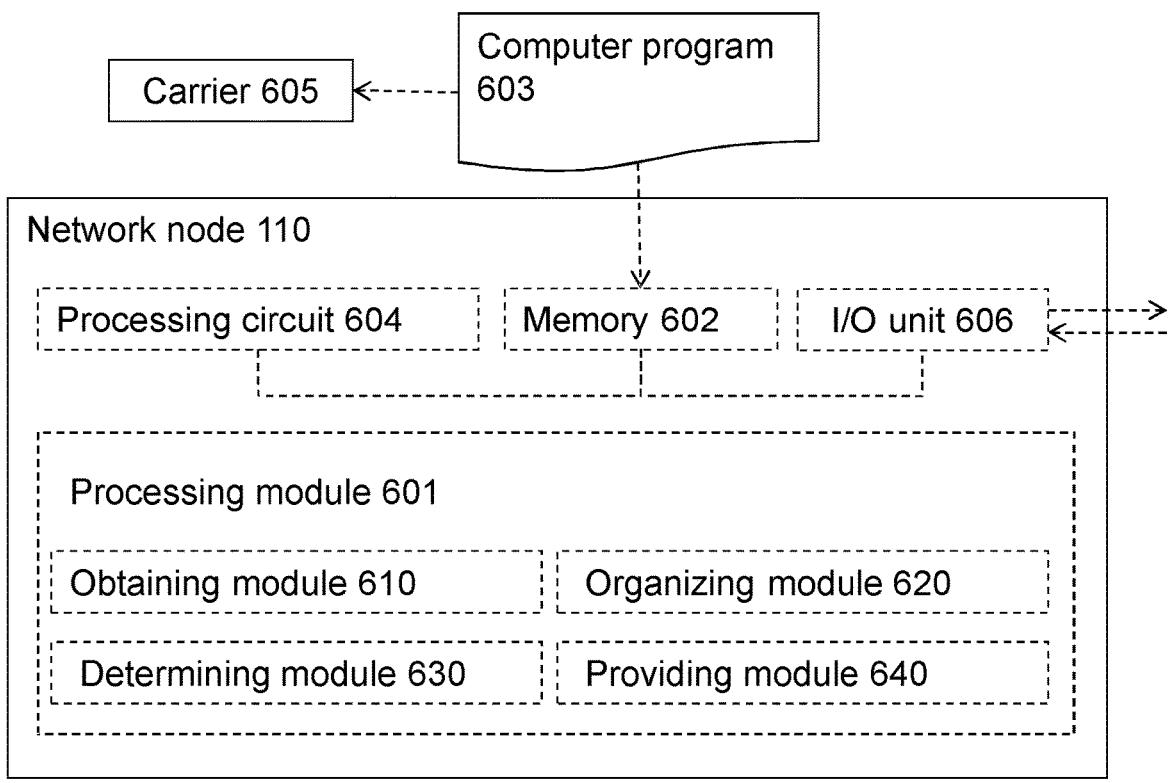
FIG. 6 is a block diagram illustrating embodiments of the managing module.

With reference to FIG. 6, a schematic block diagram of embodiments of the managing module 110 of FIG. 1 is shown.

The managing module 110 may comprise a processing module 601, such as a means for performing the methods described herein. The means may be embodied in the form of one or more hardware modules and/or one or more software modules The managing module 110 may further comprise a memory 602. The memory may comprise, such as contain or store, instructions, e.g. in the form of a computer program 603, which may comprise computer readable code units.

According to some embodiments herein, the managing module 110 and/or the processing module 601 comprises a processing circuit 604 as an exemplifying hardware module, which may comprise one or more processors. Accordingly, the processing module 601 may be embodied in the form of, or 'realized by', the processing circuit 604. The instructions may be executable by the processing circuit 604, whereby the managing module 110 is operative to perform the methods of FIG. 2 and/or FIG. 3 and/or FIG. 4 and/or FIG. 5. As another example, the instructions, when executed by the managing module 110 and/or the processing circuit 604, may cause the managing module 110 to perform the method according to FIG. 2 and/or FIG. 3 and/or FIG. 4 and/or FIG. 5.

In view of the above, in one example, there is provided a managing module 110 for enabling management of operation of a network node 131 in a network 100. As mentioned, wireless devices 141-148 are servable by the network node 131. Each wireless device 141-148 of the wireless devices 141-148 is configurable with a respective indication of an interval for reporting of data to the network node 131. A set of indications of intervals for reporting of data comprises each respective indication for the wireless devices 141-148.

Again, the memory 602 contains the instructions executable by said processing circuit 604 whereby the managing module 110 is operative for:

obtaining the set of indications of intervals for reporting of data, organising the wireless devices 141-148 into a set of one or more groups of wireless devices 141-148 based on the set of indications of intervals for reporting of data, determining information for aligning reporting from the wireless devices 141-148 within each group of the set of one or more groups, and providing the information for aligning reporting, whereby the information for aligning reporting is accessible by the network 100.

FIG. 6 further illustrates a carrier 605, or program carrier, which comprises the computer program 603 as described directly above. The carrier 605 may be one of an electronic signal, an optical signal, a radio signal and a computer readable medium.

In some embodiments, the managing module 110 and/or the processing module 601 may comprise one or more of an obtaining module 610, an organizing module 620, a determining module 630, and a providing module 640 as exemplifying hardware modules. In other examples, one or more of the aforementioned exemplifying hardware modules may be implemented as one or more software modules.

Moreover, the managing module 110 and/or the processing module 601 comprises an Input/Output unit 606, which may be exemplified by a receiving module and/or a sending module when applicable.

Accordingly, the managing module 110 is configured for enabling management of operation of a network node 131 in a network 100. As mentioned, wireless devices 141-148 are servable by the network node 131. Each wireless device 141-148 of the wireless devices 141-148 is configurable with a respective indication of an interval for reporting of data to the network node 131. A set of indications of intervals for reporting of data comprises each respective indication for the wireless devices 141-148.

Therefore, according to the various embodiments described above, the managing module 110 and/or the processing module 601 and/or the obtaining module 610 is configured for and/or the instructions causes the managing module 110 to be operative for obtaining the set of indications of intervals for reporting of data.

The managing module 110 and/or the processing module 601 and/or the organizing module 620 is configured for and/or the instructions causes the managing module 110 to be operative for organising the wireless devices 141-148 into a set of one or more groups of wireless devices 141-148 based on the set of indications of intervals for reporting of data.

Furthermore, the managing module 110 and/or the processing module 601 and/or the determining module 630 is configured for and/or the instructions causes the managing module 110 to be operative for determining information for aligning reporting from the wireless devices 141-148 within each group of the set of one or more groups.

Moreover, the managing module 110 and/or the processing module 601 and/or the providing module 640 is configured for and/or the instructions causes the managing module 110 to be operative for providing the information for aligning reporting, whereby the information for aligning reporting is accessible by the network 100.

The managing module 110 and/or the processing module 601 and/or the obtaining module 610 may be configured for and/or the instructions may cause the managing module 110 to be operative for obtaining the set of indications of intervals by obtaining information. The managing module 110 and/or the processing module 601 and/or the organizing module 620 may be configured for and/or the instructions may cause the managing module 110 to be operative for organising the set of wireless devices 141-148 into a set of one or more groups based on the information. The information may comprise the set of indications of intervals and one or more of: a set of indications about respective positions of the wireless devices 141-148, a path along which the network node 131 is capable of travelling, and the like.

A set of parameters may comprise one or more of:

the set of indication about respective positions of the wireless devices 141-148, a consumption of power used for mobility of the network node 131, a position of a core network node 120 serving the network node 131, a position of a further network node 132 providing the network node 131 with connectivity towards a core network node 120, and the like.

The managing module 110 and/or the processing module 601 and/or the determining module 630, or a further determining module (not shown), may be configured for and/or the instructions may cause the managing module 110 to be operative for determining a target position for the network node 131 based on the set of parameters. Moreover, the managing module 110 and/or the processing module 601 and/or the providing module 640, or a further providing module (not shown), may be configured for and/or the instructions may cause the managing module 110 to be operative for providing the target position, whereby the target position is accessible by the network 100.

The managing module 110 and/or the processing module 601 and/or the determining module 630, or a yet further determining module (not shown), may be configured for and/or the instructions may cause the managing module 110 to be operative for determining a scheme for pausing and resumption of a network slice related to each group of wireless devices 141-148 based on the set of indication of intervals for reporting of data and the information for aligning reporting. Furthermore, the managing module 110 and/or the processing module 601 and/or the providing module 640, or a yet further providing module (not shown), may be configured for and/or the instructions may cause the managing module 110 to be operative for providing, to the core network node 120, the scheme for pausing and resumption of the network slice, whereby the scheme is accessible by the network 100.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a dynamic link library (DLL), a software component, a software object, an object according to component object model (COM), a software function, a software engine, an executable binary software file or the like.

The terms "processing module" or "processing circuit" may herein encompass a processing unit, comprising e.g. one or more processors, an application specific integrated circuit (ASIC), a field-programmable gate array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a universal serial bus (USB) memory, a digital versatile disc (DVD), a Blu-ray disc, a software module that is received as a stream of data, a Flash memory, a hard drive, a memory card, such as a MemoryStick, a multimedia card (MMC), secure digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method comprising:
obtaining a set of indications of intervals for reporting of data;
organising a plurality of wireless devices into a set of one or more groups of wireless devices based on the set of indications of intervals for reporting of data;
determining information for aligning reporting from the wireless devices within each group of the set of one or more groups;
providing the information for aligning reporting, whereby the information for aligning reporting is accessible by a network;
determining a target position for a network node based on a set of one or more parameters related to the intervals for reporting data, and
providing the target position, whereby the target position is accessible by the network.

2. The method of claim 1, wherein the network node is a radio network node or a mobile radio network node.

3. The method of claim 2, wherein the obtaining of the set of indications of intervals comprises obtaining information, wherein the organising of the wireless devices into a set of one or more groups is based on the information, wherein the information comprises the set of indications of intervals and one or more of:
a set of indications about respective positions of the wireless devices, or
a path along which the network node is capable of travelling.

4. The method of claim 1, wherein the set of parameters comprises one or more of:
a set of indication about respective positions of the wireless devices,
a consumption of power used for mobility of the network node, a position of a core network node serving the network node, or a position of a further network node providing the network node with connectivity towards the core network node.

5. The method of claim 4, wherein the method further comprises:

determining a scheme for pausing and resumption of a network slice related to each group of wireless devices based on the set of indication of intervals for reporting of data and the information for aligning reporting, and providing, to the core network node, the scheme for pausing and resumption of the network slice, whereby the scheme is accessible by the network.

6. A device comprising:

a memory; and processing circuitry coupled to the memory, where the device is configured to:

obtain a set of indications of intervals for reporting of data;

organize a plurality of wireless devices into a set of one or more groups of wireless devices based on the set of indications of intervals for reporting of data;

determine information for aligning reporting from the wireless devices within each group of the set of one or more groups;

provide the information for aligning reporting, whereby the information for aligning reporting is accessible by a network;

determine a target position for a network node based on a set of one or more parameters related to the intervals for reporting data; and provide the target position, whereby the target position is accessible by the network.

7. The device of claim 6, wherein the network node is a radio network node or a mobile radio network node.

8. The device of claim 7, wherein the device is configured for obtaining the set of indications of intervals by obtaining information, wherein the device is configured for organising the set of wireless devices into a set of one or more groups based on the information, wherein the information comprises the set of indications of intervals and one or more of:

a set of indications about respective positions of the wireless devices, or a path along which the network node is capable of travelling.

9. The device of claim 7, wherein a set of parameters comprises one or more of:

a set of indication about respective positions of the wireless devices, a consumption of power used for mobility of the network node, a position of a core network node serving the network node, or a position of a further network node providing the network node with connectivity towards the core network node.

10. The device of claim 9, wherein the device is further configured for:

determining a scheme for pausing and resumption of a network slice related to each group of wireless devices based on the set of indication of intervals for reporting of data and the information for aligning reporting; and providing the scheme for pausing and resumption of the network slice, whereby the scheme is accessible by the network.

11. A computer program product comprising a non-transitory computer readable medium storing a computer program comprising computer readable code units which when executed by processing circuitry of a managing module causes the managing module to perform the method of claim 1.

* * * * *